Figure 1:
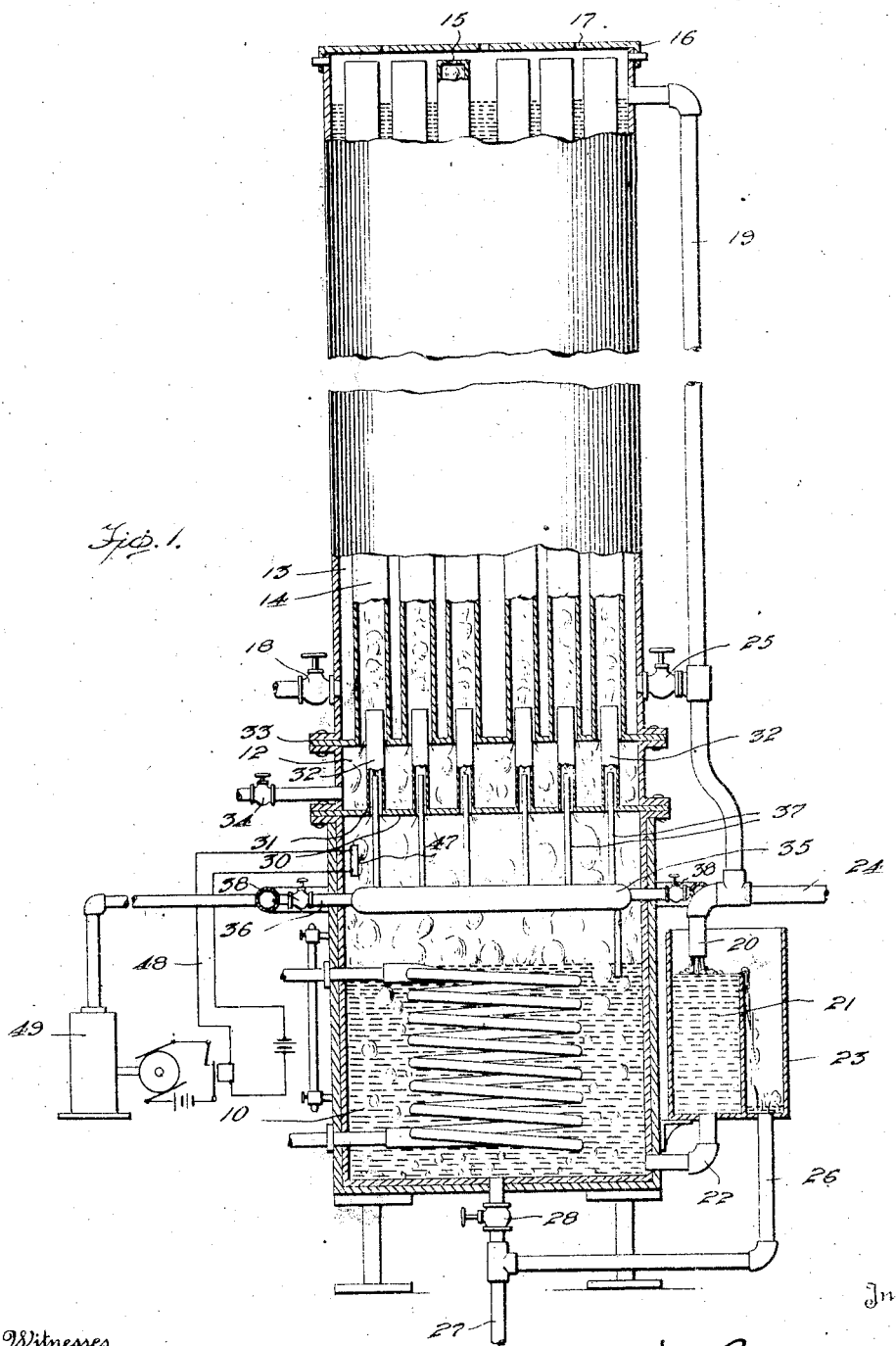

D. P. MOORE.
TRIPLE PURIFICATION STILL.
APPLICATION FILED FEB. 17, 1916.

1,204,300.

Patented Nov. 7, 1916.
3 SHEETS—SHEET 1.

Witnesses
Paul M. Hunt
J. W. Roberts

Inventor
David Pelton Moore

D. P. MOORE.
TRIPLE PURIFICATION STILL.
APPLICATION FILED FEB. 17, 1916.
1,204,300.  
Patented Nov. 7, 1916.  
3 SHEETS—SHEET 2.
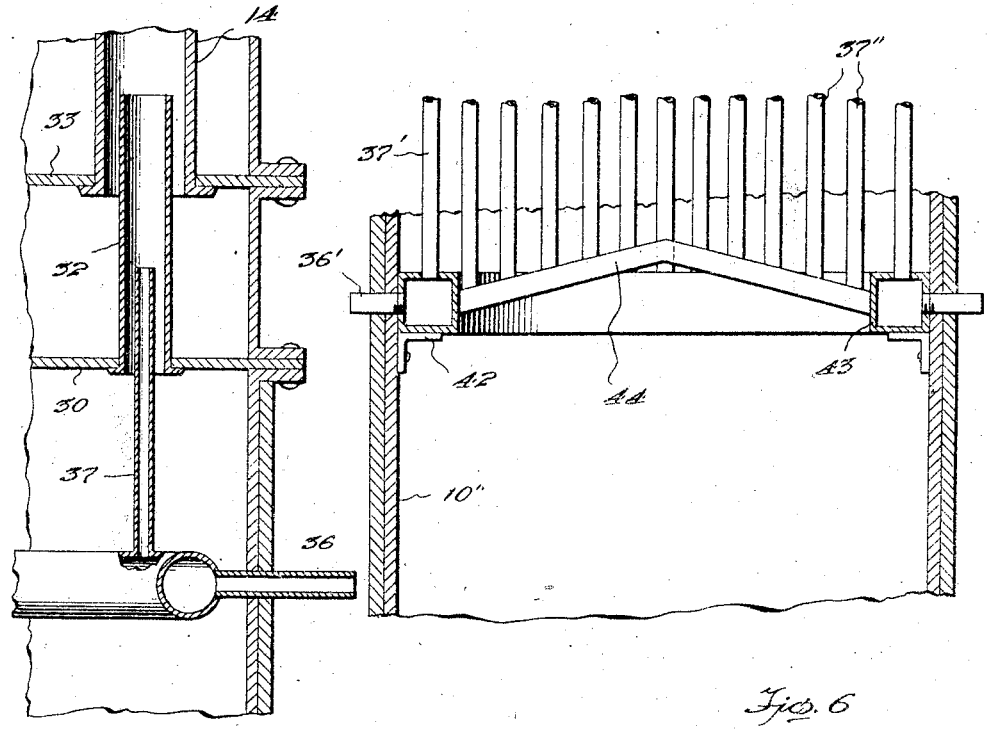
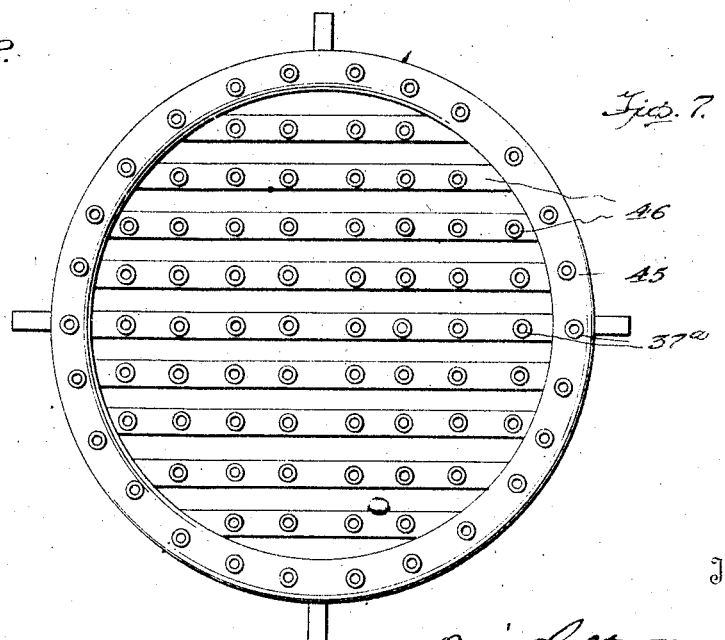

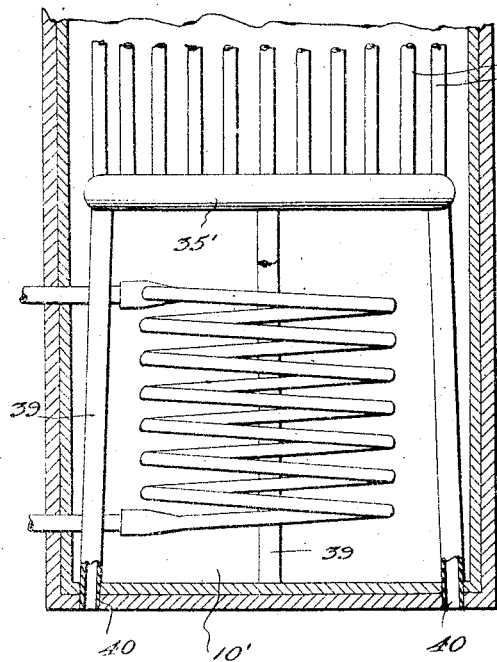
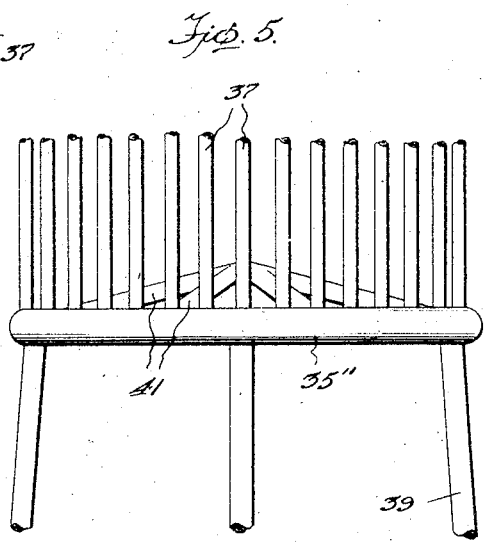
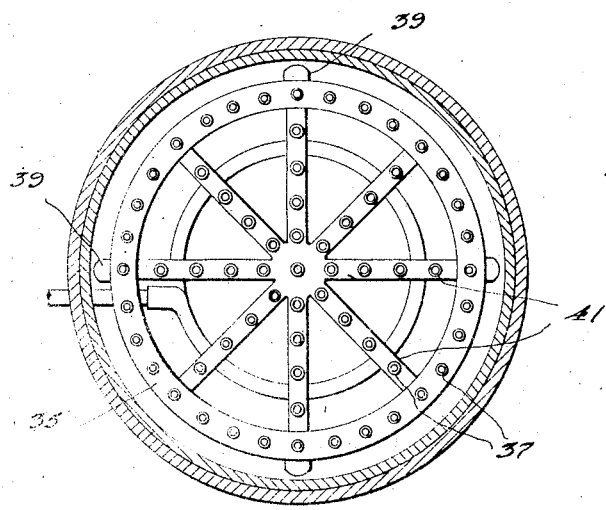

UNITED STATES PATENT OFFICE.

DAVID PELTON MOORE, OF WASHINGTON, DISTRICT OF COLUMBIA, ASSIGNOR, BY DIRECT AND MESNE ASSIGNMENTS, OF ONE-HALF TO JESSE SPAULDING MERRILL, OF WASHINGTON, DISTRICT OF COLUMBIA, AND ONE-HALF TO GEORGE H. DRAPER, OF THE DISTRICT OF COLUMBIA.

TRIPLE PURIFICATION-STILL.

1,204,300.    Specification of Letters Patent.    Patented Nov. 7, 1916.

Application filed February 17, 1916.  Serial No. 78,927.

*To all whom it may concern:*

Be it known that I, DAVID PELTON MOORE, a citizen of the United States, residing at Washington, in the District of Columbia, have invented certain new and useful Improvements in Triple Purification-Stills, of which the following is a specification, reference being had therein to the accompanying drawing.

This invention relates to improvements in triple purification water stills, one object of the invention being the provision of a still which will insure a continuous operation, and by means of which the water is subjected to distinct purification processes whereby volatile gases, sediment, and other extraneous matter are removed, and the water itself aerated to produce a pure, delicious and palatable water.

Heretofore, as in the U. S. Letters Patent to John A. Power, No. 988,661, dated April 4th, 1911, for triple purification water-stills, and in the U. S. Letters Patent to Joseph A. Manahan, No. 1,145,497, dated July 6th, 1915, for water-stills, several stills have been devised, and employ means for supplying air to the water vapors so that the distilled water is sufficiently aerated, the air, however, being introduced at a point where it tends to chill the vapors too suddenly, and also where a vacuum is caused in the air admitting chamber, and thus interferes with the proper flow of air in the proportion necessary to aerate the water. This is particularly true of the construction shown in the Power Patent No. 988,661, while in the construction shown in the Manahan patent, the air did not properly commingle with the vapor before being introduced into the condenser tubes.

It is therefore a further object of this invention to so place the air supplying member or medium as to keep the same at the proper temperature before the commingling thereof with the water vapors, thus insuring the thorough commingling of the air in the desired proportion, so that the distilled water is naturally aerated and is not flat when drawn from the still. To do this, the air conveying tubes must project into the vapor conduits, which in turn must project into the lower ends of the condenser tubes, the various tubes increasing in diameter from the air outlet tubes to the condenser tubes.

With the foregoing and other objects in view and which will be apparent as the description proceeds, this invention resides in the novel arrangement and combination of parts hereinafter disclosed, the scope of the invention, however, being limited only by what is claimed.

In the accompanying drawings:—Figure 1 is a sectional side elevation of a water still made according to and embodying the present invention. Fig. 2 is an enlarged sectional view showing on an enlarged scale the position of the air and vapor conduction members. Fig. 3 is an enlarged detail sectional view showing a modified arrangement of the air supplying member. Fig. 4 is a top plan view of the air heating chamber and a cross section of the evaporating chamber, as illustrated in Fig. 3. Figs. 5, 6, and 7 are detail views of other modified forms of air supplying members.

Referring to the drawings and more particularly to Figs. 1 and 2 thereof, the numeral 10 designates the evaporating chamber of the present mechanism, which has mounted therein the heating coil 11 and has disposed thereupon in superposed relation the distilled water reservoir 12 and the condenser 13. Mounted in the condenser 13 are a plurality of condenser tubes 14 which have formed in the top thereof ports 15, while in the cover 16 of the condenser 13 are ports 17, all of usual construction. Raw water is supplied to the condenser 13 at the lower portion of its body by means of the valve controlled pipe 18, while leading therefrom at the water level adjacent the upper end thereof, is a pipe 19 having an outlet spout 20 disposed above the level maintaining reservoir 21 which is in communication through the pipe 22 to the evaporating chamber 10, an overflow casing 23 surrounding the reservoir 21. A drain pipe 24 leads from the pipe 19, while a clean-out valve 25 is connected adjacent the bottom of the condenser 13 with the pipe 19. A pipe 26 leads from the overflow pipe 23 and is in communication with the drain pipe 27 which has a valve connection 28 with the outlet 29 of the evaporating chamber 10.

Formed in the bottom wall 30 of the distilled water reservoir 12 are a plurality of vapor inlets 31 which have in communication therewith and projecting through the reservoir 12 into the lower end of the condensing tubes 14, the vapor conducting tubes 32. By this means vapor is permitted to enter the tubes 14 where it is condensed and drips through the outlets 33 at the bottom of the tubes 14 into the reservoir 12, where the same may be drawn therefrom by means of the outlet 34. Mounted within the evaporating chamber, and adapted to be heated directly from the vapor arising from the water therein due to the heating of the coil 11, is an air containing medium 35 which, as shown in Figs. 1 and 2, is provided with the radial air inlet pipes 36 mounted in the wall of the chamber 10 and in communication with the outside air. Upstanding from the medium 35 are a plurality of air conducting pipes or nipples 37 which project into the lower ends of the tubes 32 a sufficient distance to thoroughly commingle the heated vapor moving upwardly through the tubes and which to a great extent induce a suction action through the nipples 37 so that the heated air, which naturally rises, is accelerated in its flow and thus thoroughly aerates the vapor during the condensing operation thereof.

Adapted to be connected in each one of the inlet pipes 36 is an adjusting valve 38, by means of which the flow of air to the medium 35 may be regulated to a nicety.

In the construction shown in Figs. 3 and 4, the air containing medium 35' has its air inlet ports 39 connected to the openings 40 at the bottom of the condensing chamber 10', while in the construction as shown in Fig. 5, the spoke arranged tubes 41 of the heating medium 35'' are dished to assist in conducting heated air to the center, due to the natural tendency of the heated air to rise.

In the construction shown in Fig. 6, brackets 42 are attached to the inner wall of the evaporating chamber 10'' to receive the rectangular-in-cross-section ring 43 which constitutes the air heating medium, there being led from the ring upwardly therefrom the nipples 37', while the dished spoked tubes 44 are provided with similar air nipples 37''. In this form, the air induction pipes 36' are led through the wall, but may be led from the bottom without departing from the spirit of this invention.

In the construction shown in Fig. 7, the air heating medium consists of the annular member 45 having the tubular members 46 disposed in parallel, the air directing nipples 37ª being carried by the hollow members with the air induction port or pipes either projecting from below or radially. With this construction of still, with the air supplying and heating medium disposed within the evaporating chamber, the air is thoroughly heated without tending to chill the vapors at a disadvantageous point as is the case where the air supplying chamber is disposed at the top and adjacent the bottom of the distilled water reservoir, as in common practice.

It is also advisable with the present still to have disposed within the evaporating chamber a thermostatic control 47 which operates through the electrical circuit 48 an air controlling member or fan 49 so that the supply of air to the heating medium will be in proportion to the vapor, thus insuring automatic aerating means to insure of a more palatable distilled water and as near to a natural water as is possible. By this arrangement, unpolluted air may be filtered and brought from a point distant from the still and thus insure a clean sweet water.

In order that the air chamber 35 may be automatically drained of any condensation, a tube is led therefrom to a point below the water level in the evaporator 10.

It will thus be seen with this arrangement that the air enters the heating chamber of the still, and is there properly heated, and permitted to flow through the air outlets into the larger vapor conduits, which in turn have their outlet ends projected into the lower ends of the still larger condenser tubes. It has also been discovered that the cool air entering the heating coil or medium within the evaporating chamber, has a baffling effect upon the vapor, and that precipitants, such as sulfur and magnesia, are thrown down at this point, instead of being carried into the vapor outlets and condenser tubes as in the two forementioned patented structures.

What I claim, as new, is:

1. A water still, including an evaporating chamber having vapor outlets, an air heater disposed within the evaporating chamber and having an air inlet and heated air outlets extending into the vapor outlets, a condenser having condenser tubes, and into which the vapor outlets extend, the air outlets being so arranged that the air and vapor are commingled in the vapor outlets and in the condenser tubes.

2. A water still, including an evaporator, a distilled water reservoir located thereabove, a condenser having a plurality of tubes located above the reservoir, said evaporator having vapor outlets extending through the reservoir projected into the lower ends of the condenser tubes, and an air heater located within the evaporator and having an outside air inlet and a plurality of air outlets, said outlets being of lesser diameter and projected into and in communication with the vapor outlets, the upper ends of said air outlets terminating below the upper ends of the vapor outlets.

3. A water still, including an evaporator, a distilled water reservoir located thereabove, a condenser having a plurality of condenser tubes located above the reservoir, a plurality of vapor conduits of lesser diameter than said condenser tubes leading from the evaporator into the lower ends of the condenser tubes, an air heater located within the evaporator and having an air inlet, and a plurality of air outlet pipes of lesser diameter than the vapor conduits and leading from the heater and into the vapor conduits, the upper ends of said pipes terminating within the conduits.

4. A water still, including an evaporator, a distilled water reservoir located thereabove, a condenser having a plurality of condenser tubes open at their lower ends, and in communication with the reservoir, a plurality of vapor conduits one to each tube leading from the evaporator and projected into the lower ends of the tubes, and an air heater mounted within the evaporator and having an air inlet and plurality of air outlets one to, and projecting into, each vapor conduit, said air outlets terminating bodily within the vapor conduits whereby a successive commingling of the air with the vapor is attained within the vapor conduits and finally in the condenser tubes.

5. A water still, including an evaporator, a distilled water reservoir located thereabove, a condenser having a plurality of condenser tubes open at their lower ends and in communication with the reservoir, a plurality of vapor conduits of lesser diameter than and one to each tube leading from the evaporator and projected into the lower ends of the tubes, an air heater located within the evaporator, an air inlet leading from the atmosphere to the heater, and a plurality of air outlet pipes of lesser diameter than the vapor conduits and leading from the heater and projected in the vapor conduits.

6. A water still, including an evaporator, a condenser, a plurality of condenser tubes mounted in the condenser, a distilled water reservoir in communication with the condenser tubes, a plurality of vapor conduits of lesser diameter than the tubes leading from the evaporator into the condenser tubes, and an air heater and circulator mounted within the evaporator and having an air inlet and a plurality of air outlets, said air outlets being surrounded by and in communication with the lower ends of the vapor conduits.

7. A water still, including an evaporator, a condenser, an air supplying and heating medium mounted within the evaporator and heated therein, said medium being provided with an air inlet and an air outlet, and thermostatically controlled means for regulating the flow of air to the inlet.

8. A water still, including an evaporator, a condenser, an air supplying and heating medium mounted within the evaporator to be heated simultaneously with the water therein, said medium having an air inlet extended exteriorly of the evaporator, automatically controlled means for regulating the flow of air through said inlet, and a plurality of air inlets extending to commingle with the vapors during condensation thereof.

9. A water still, including an evaporator having a heating coil mounted therein, an air supplying and heating medium mounted within the evaporator above the coil, an air inlet leading from the exterior of the evaporator to said medium, a plurality of air outlet pipes leading from the medium, a plurality of vapor conduits telescopically fitting over the upper ends of the air outlet pipes, a condenser having a plurality of condenser tubes telescopically fitting over the upper ends of the vapor conduits, and a distilled water reservoir also in communication with the tubes.

10. A water still, including an evaporator, a condenser having a plurality of condenser tubes, a plurality of vapor conduits, one to each tube projected into said tubes and providing a distilled water outlet between the tube and the conduit, an air supplying and heating medium mounted within the evaporator, an air inlet for the medium, a plurality of air outlet conduits of lesser size than the vapor conduits, one to each vapor conduit, said air outlet conduits projecting into the lower ends of the vapor conduits, and a distilled water reservoir to receive the condensed and aerated water from the condenser tubes.

11. A water still, including an evaporator, a distilled water reservoir, a condenser having a plurality of condenser tubes, a plurality of vapor tubes leading from the evaporator into the condenser tubes, an air heater incased by and within the evaporator, an air inlet for the air heater, and a plurality of air outlet tubes, one to each vapor tube, projected into the lower ends of said vapor tubes, said air, vapor and condenser tubes being successively telescoped to provide concentric spaces, the spaces of the condenser tubes being in communication with the reservoir.

12. The combination with a water still having an evaporating chamber, a condensing chamber, means for conducting the vapor from the evaporator to the condenser, and an air supplying means for supplying air to the vapor in transit, of automatic means for controlling the supply of air to the air supplying means including a thermostat mounted within the evaporator, and air directing means operably connected to the thermostat and the air supplying means.

13. The combination with a water still having an evaporating chamber, a condensing chamber, means for conducting the vapor from the evaporator to the condenser, and an air supplying means for supplying air to the vapor in transit, of an air supplying fan located at a distant point and in communication with the air supplying means, and thermostatically controlled means for controlling the air supplying fan.

14. The combination with a water still having an evaporating chamber, a condensing chamber, means for conducting the vapor from the evaporator to the condenser, and an air supplying means for supplying air to the vapor in transit, of an air supplying fan located at a distant point and in communication with the air supplying means, a thermostat located in the evaporator, and electrical means connected to the thermostat for in turn controlling the air supplying fan.

In testimony whereof I affix my signature.

DAVID PELTON MOORE.